US012497761B2

(12) United States Patent
Miura et al.

(10) Patent No.: US 12,497,761 B2
(45) Date of Patent: Dec. 16, 2025

(54) MONITORING SYSTEM FOR WORKING MACHINE

(71) Applicant: KUBOTA CORPORATION, Osaka (JP)

(72) Inventors: Keisuke Miura, Osaka (JP); Ryo Ikeda, Osaka (JP); Ryosuke Kinugawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 131 days.

(21) Appl. No.: 18/383,132

(22) Filed: Oct. 24, 2023

(65) Prior Publication Data

US 2024/0052604 A1 Feb. 15, 2024

Related U.S. Application Data

(63) Continuation of application No. PCT/JP2022/013924, filed on Mar. 24, 2022.

(30) Foreign Application Priority Data

Apr. 27, 2021 (JP) .................................. 2021-075270
Apr. 27, 2021 (JP) .................................. 2021-075271

(51) Int. Cl.
*E02F 9/26* (2006.01)
(52) U.S. Cl.
CPC .................................... *E02F 9/264* (2013.01)
(58) Field of Classification Search
CPC ...... B60R 25/102; B60R 25/33; E02F 9/2054; E02F 9/261; E02F 9/264; G08B 21/0261
See application file for complete search history.

(56) References Cited

U.S. PATENT DOCUMENTS 10,775,796 B2 * 9/2020 Newlin .................. G01C 21/20
12,185,662 B2 * 1/2025 Shimamura .......... G05D 1/0246
(Continued)

FOREIGN PATENT DOCUMENTS

JP 54-92295 U1 6/1979
JP 2002-173003 A 6/2002
(Continued)

OTHER PUBLICATIONS

International Search Report issued May 31, 2022 in International Application PCT/JP2022/013924 and English translation thereof.
(Continued)

*Primary Examiner* — Tyler J Lee
(74) *Attorney, Agent, or Firm* — Greenblum & Bernstein, P.L.C.

(57) ABSTRACT

A monitoring system for a working machine includes: a position detector to determine a position of a working machine based on radio waves from positioning satellite(s); an area setter to set work area information indicating whether work area(s) is/are in a shielded environment or an unshielded environment, the work area(s) being area(s) where work is to be done by the working machine, the shielded environment being an environment in which the radio waves are likely to be blocked, the unshielded environment being an environment in which the radio waves are unlikely to be blocked; and a monitor to evaluate a state of position determination by the position detector based on a result of the position determination by the position detector, and provide a notification if there is a predetermined change in the state of the position determination compared to a state of position determination corresponding to the work area information.

7 Claims, 9 Drawing Sheets

(56) References Cited

U.S. PATENT DOCUMENTS

| | | | |
|---|---|---|---|
| 2001/0022818 A1* | 9/2001 | Nagata | H04L 27/00 |
| | | | 375/259 |
| 2004/0075541 A1 | 4/2004 | Simoneau | |
| 2015/0220086 A1* | 8/2015 | Willgert | A01D 34/008 |
| | | | 701/26 |
| 2018/0196438 A1* | 7/2018 | Newlin | G01C 21/3852 |
| 2020/0050208 A1* | 2/2020 | Frick | G05D 1/245 |
| 2020/0267896 A1* | 8/2020 | Ingvalson | G05D 1/0223 |
| 2022/0000017 A1* | 1/2022 | Shimamura | G05D 1/0212 |
| 2022/0232750 A1* | 7/2022 | Shirafuji | G05D 1/0278 |
| 2022/0333346 A1* | 10/2022 | Mizuochi | H04W 4/029 |
| 2022/0412052 A1* | 12/2022 | Moriki | E02F 9/2033 |
| 2023/0358024 A1* | 11/2023 | Shiwaku | E02F 9/262 |

FOREIGN PATENT DOCUMENTS

| | | |
|---|---|---|
| JP | 2002-220957 A | 8/2002 |
| JP | 2011-227763 A | 11/2011 |
| JP | 2012-071776 A | 4/2012 |
| JP | 2018-161085 A | 10/2018 |

OTHER PUBLICATIONS

Written Opinion issued May 31, 2022 in International Application PCT/JP2022/013924 and English translation thereof.

Office Action issued Nov. 21, 2023 in corresponding Japanese family member application No. 2021-075271 with English language translation thereof.

Official Communication, dated May 9, 2025, issued in European Patent Office (EPO) Patent Application No. 22795392.4.

* cited by examiner

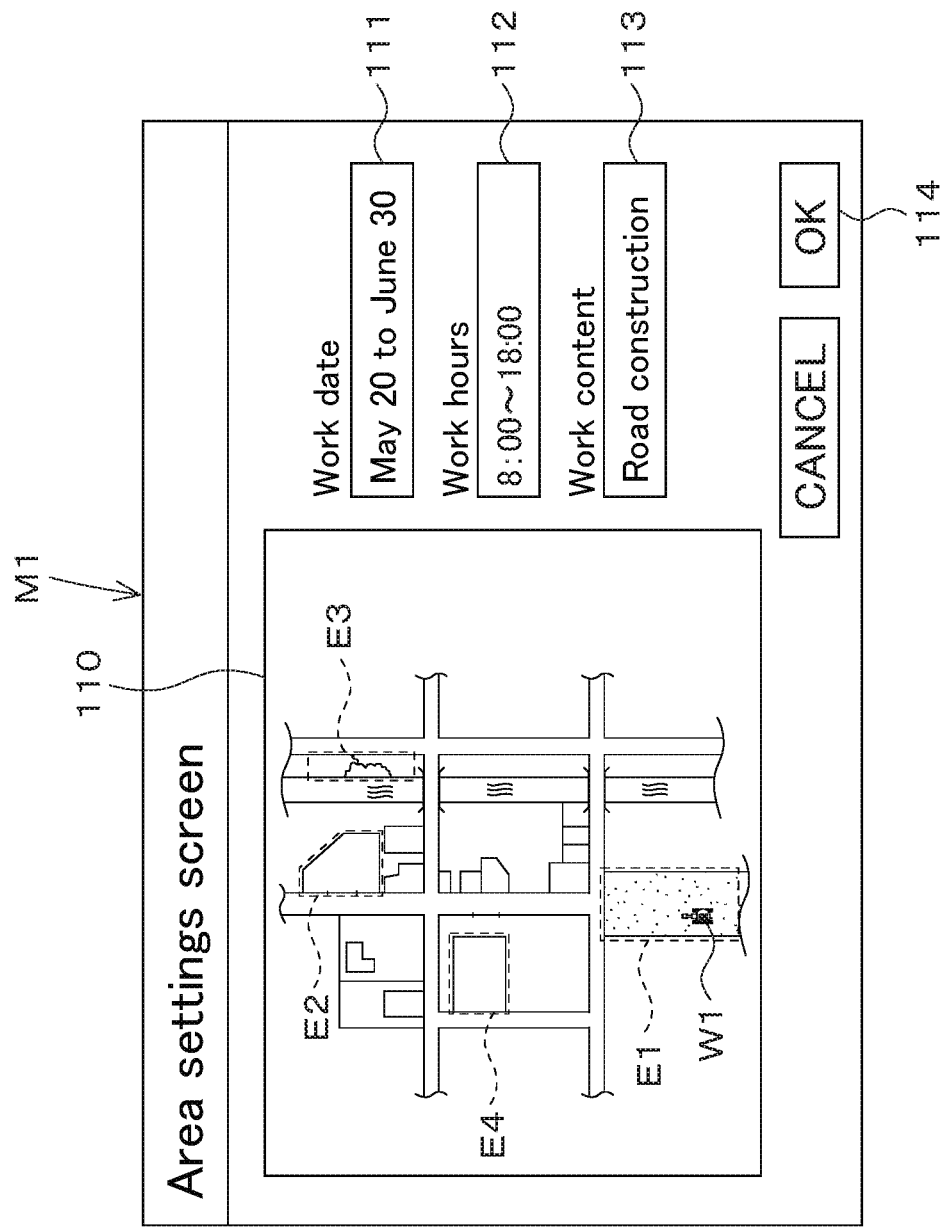

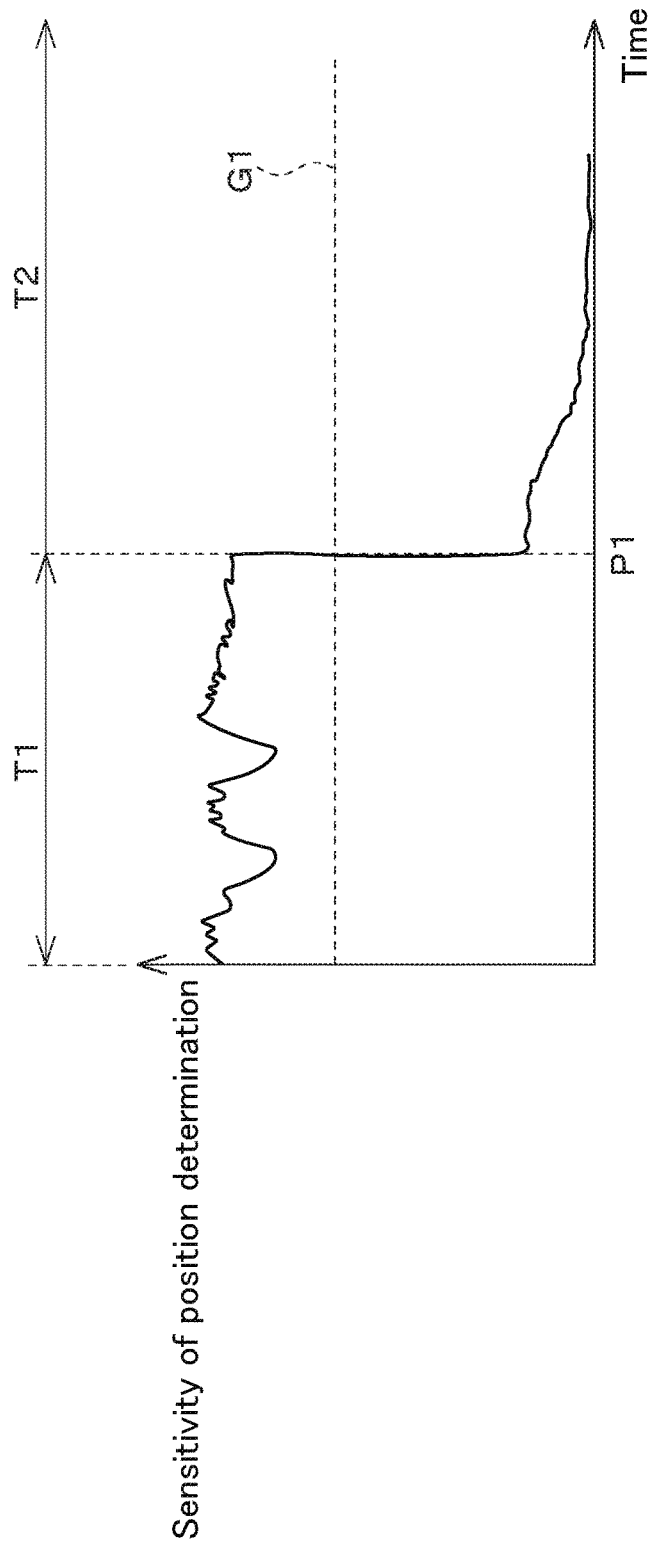

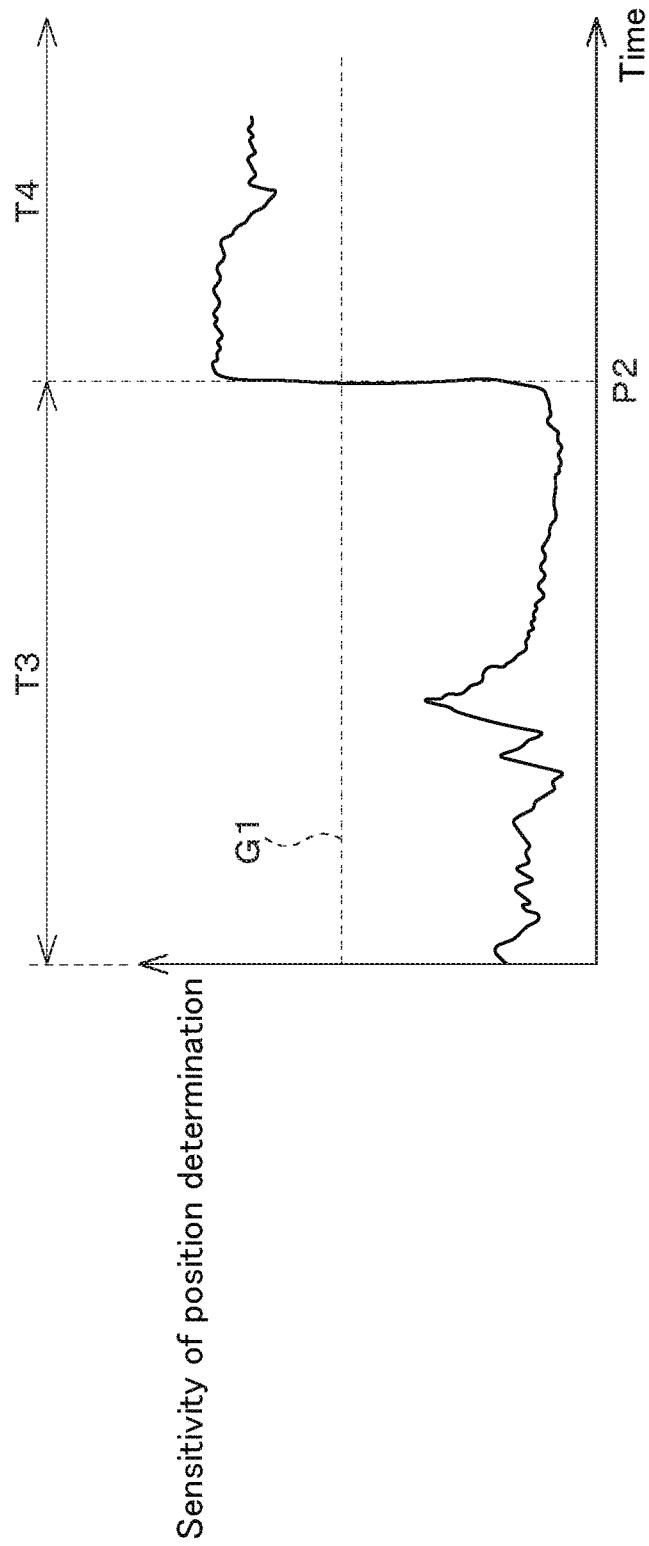

determination compared to a state of position determination corresponding to the work area information.

In an aspect of the present invention, the position detector may be provided in or on the working machine. The area setter may be configured or programmed to acquire content of the work to be done by the working machine and map information about the position of the working machine determined by the position detector and a vicinity thereof, and set the work area information about the at least one work area based on the content of the work and the map information.

In an aspect of the present invention, the monitor may be configured or programmed to evaluate a sensitivity of the position determination as being low if the at least one work area is in the shielded environment, the sensitivity of the position determination being the state of the position determination, and provide the notification if the sensitivity of the position determination by the position detector changes from a value less than a predetermined value to a value equal to or greater than the predetermined value.

In an aspect of the present invention, the monitor may be configured or programmed to evaluate a sensitivity of the position determination as being high if the at least one work area is in the unshielded environment, the sensitivity of the position determination being the state of the position determination, and provide the notification if the sensitivity of the position determination by the position detector changes from a value equal to or greater than a predetermined value to a value less than the predetermined value.

In an aspect of the present invention, the monitor may be configured or programmed to provide the notification if the working machine is driven and the sensitivity of the position determination by the position detector changes from a value equal to or greater than the predetermined value to a value less than the predetermined value.

In an aspect of the present invention, the area setter may be configured or programmed to acquire map information indicating whether or not there is a blocking object to block the radio waves in the at least one work area, and content of the work to be done by the working machine, and if there is a blocking object in the at least one work area and the content of the work relates to construction in the shielded environment, set the work area information indicating that the at least one work area is in the shielded environment.

In an aspect of the present invention, the area setter may be configured or programmed to acquire map information indicating whether or not there is a blocking object to block the radio waves in the at least one work area, and content of the work to be done by the working machine, and if there is no blocking object in the at least one work area and the content of the work relates to construction in the unshielded environment, set the work area information indicating that the at least one work area is in the unshielded environment.

In an aspect of the present invention, the monitor may be configured or programmed to associate the position of the working machine determined by the position detector with map information, and not provide the notification if the position associated with the map information is at a location indicated by the map information and unreachable by the working machine.

In an aspect of the present invention, the monitor may be configured or programmed to provide the notification if the position of the working machine determined by the position detector is outside the at least one work area and the degree of fluctuation is less than a predetermined value, the degree of fluctuation being the degree to which the position of the working machine determined by the position detector fluc-

MONITORING SYSTEM FOR WORKING MACHINE

CROSS REFERENCE TO RELATED APPLICATIONS

This application is a continuation application of International Application No. PCT/JP2022/013924, filed on Mar. 24, 2022, which claims the benefit of priority to Japanese Patent Application No. 2021-075270, filed on Apr. 27, 2021, and to Japanese Patent Application No. 2021-075271, filed on Apr. 27, 2021. The entire contents of each of these applications are hereby incorporated herein by reference.

1. FIELD OF THE INVENTION

The present invention relates to a monitoring system for working machine(s).

2. DESCRIPTION OF THE RELATED ART

An operation system for a working machine disclosed in Japanese Unexamined Patent Application Publication No. 2012-71776 is known. Japanese Unexamined Patent Application Publication No. 2012-71776 discloses a system in which an area in which the working machine is placed (area of a store) is predetermined, and, if the working machine goes out of the area, a warning etc. is issued and/or the operation of the working machine is limited, thus protecting the working machine against theft.

SUMMARY OF THE INVENTION

According to Japanese Unexamined Patent Application Publication No. 2012-71776, the protection against theft is such that an area in which the working machine is placed is predetermined in the vicinity of the store, and the working machine is protected against theft when it is stolen from the area even though the working machine has not been purchased.

Working machines such as a backhoe perform construction or the like usually at various locations, and they may be left at the site or the like until the construction is completed. There is therefore a demand for the protection against theft also in cases where the working machine performs construction or the like at various locations.

In view of the above demand, embodiments of the present invention provide monitoring systems for working machines each of which makes it possible to perform protection against theft at, for example, the location where the working machine does work.

A monitoring system for a working machine according to an aspect of the present invention includes: a position detector to determine a position of a working machine based on radio waves from one or more positioning satellites; an area setter to set work area information indicating whether at least one work area is in a shielded environment or an unshielded environment, the at least one work area being at least one area in which work is to be done by the working machine, the shielded environment being an environment in which the radio waves are likely to be blocked, the unshielded environment being an environment in which the radio waves are unlikely to be blocked; and a monitor to evaluate a state of position determination by the position detector based on a result of the position determination by the position detector, and provide a notification if there is a predetermined change in the evaluated state of the position tuates into and out of the at least one work area, and not provide the notification if the degree of fluctuation is equal to or greater than the predetermined value even when the position of the working machine determined by the position detector is outside the at least one work area.

A monitoring system for a working machine according to an aspect of the present invention includes: a position detector to determine a position of a working machine based on one or more signals from one or more positioning satellites; an area setter to set at least one work area in which work is to be done by the working machine; and a monitor to provide a notification if the position of the working machine determined by the position detector is outside the at least one work area and the degree of fluctuation is less than a predetermined value, the degree of fluctuation being the degree to which the position of the working machine determined by the position detector fluctuates into and out of the at least one work area, and not provide the notification if the degree of fluctuation is equal to or greater than the predetermined value even when the position of the working machine determined by the position detector is outside the at least one work area.

In an aspect of the present invention, the monitor may be configured or programmed to determine a direction of travel of the working machine based on a plurality of the positions of the working machine determined by the position detector, and provide the notification if the working machine is not driven and the direction of travel of the working machine does not change by a predetermined angle or more for a predetermined period of time or more.

In an aspect of the present invention, the monitor may be configured or programmed to determine a direction of travel of the working machine based on a plurality of the positions of the working machine determined by the position detector, and provide the notification if the direction of travel of the working machine is away from the at least one work area for a predetermined period of time or more.

In an aspect of the present invention, the monitor may be configured or programmed to determines a travel speed of the working machine based on a plurality of the positions of the working machine determined by the position detector, and provide the notification if the travel speed is equal to or greater than a predetermined value.

In an aspect of the present invention, the monitor may be configured or programmed to provide the notification if the position of the working machine determined by the position detector is at a predetermined distance or more from the at least one work area.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3 is an example of a settings screen displayed on a portable terminal.

FIG. 4A is a chart showing an example in which the sensitivity of the position determination by a position detector drops.

FIG. 4B is a chart showing an example in which the sensitivity of the position determination by a position detector increases suddenly.

DETAILED DESCRIPTION OF THE PREFERRED EMBODIMENTS

Figure 1:
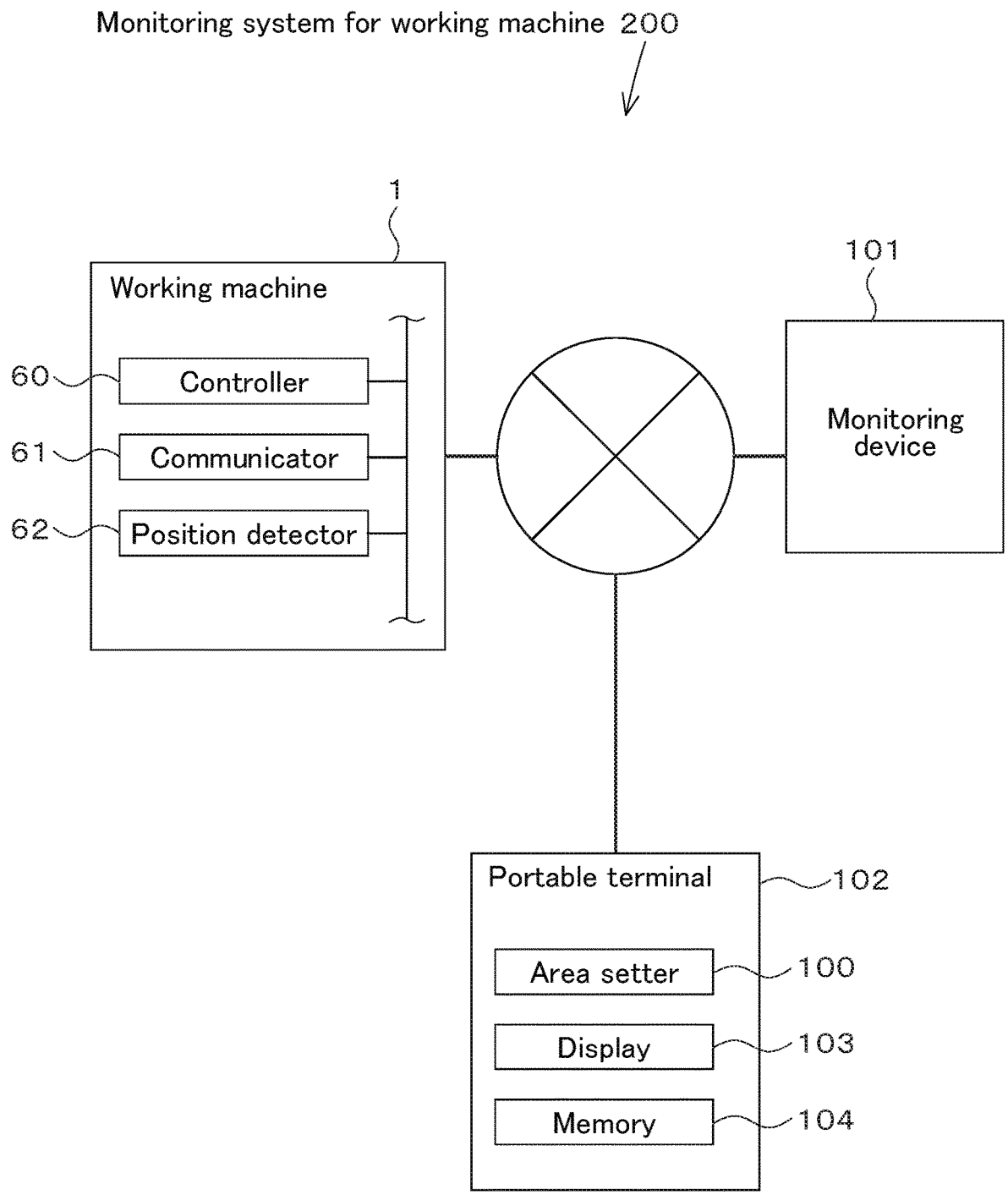
FIG. 1 is a general view of a monitoring system for a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses an embodiment of the present invention with reference to drawings as appropriate.

First Embodiment

FIG. 1 is a general view of a monitoring system 200 for working machine(s). As illustrated in FIG. 1, the monitoring system 200 for working machine(s) is a system to monitor working machine(s) 1 such as a constructing machine including a backhoe, a loader, and the like, and an agricultural machine including a tractor, a combine, a rice transplanter, and the like. In the following description, the monitoring system 200 for working machine(s) is simply referred to as a "monitoring system 200" for convenience of description.

Figure 8:
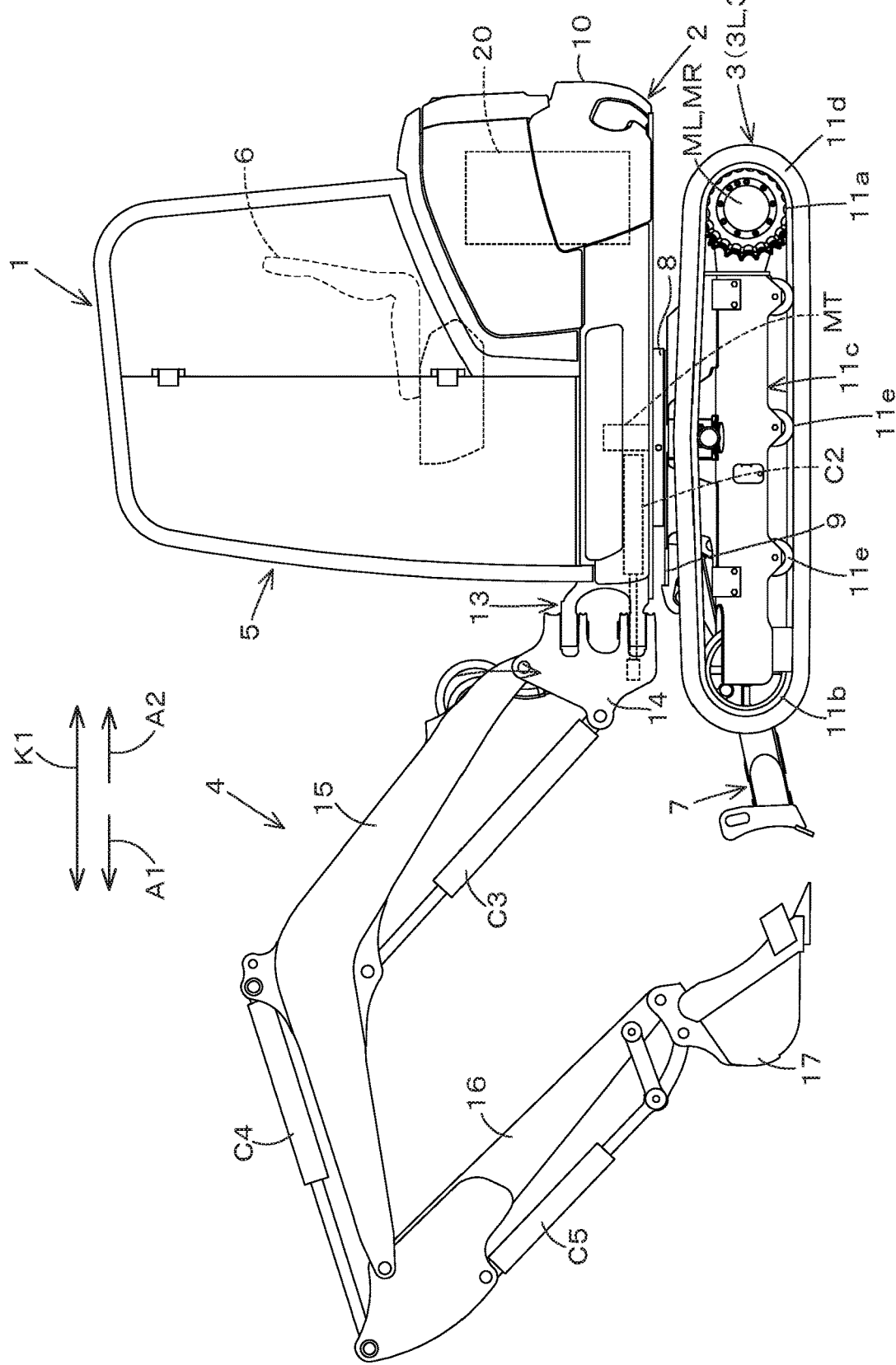
FIG. 8 is a side view of a working machine.

The following first describes a working machine 1. FIG. 8 is a side view of the working machine 1. In the present embodiment, a backhoe which is a swiveling working machine is discussed as an example of the working machine 1. However, the working machine 1 is not limited to a backhoe, and may be a constructing machine such as a loader or an agricultural machine such as a tractor, a combine, or a rice transplanter. As illustrated in FIG. 8, the working machine 1 includes a machine body (swivel base) 2, a traveling device 3, and a working device 4. A cabin 5 is provided on the machine body 2. The cabin 5 contains an operator's seat 6.

In the present embodiment, a forward direction from an operator seated on the operator's seat 6 of the working machine 1 (the direction indicated by arrow A1 in FIG. 8) is referred to as a forward direction, a rearward direction from the operator (the direction indicated by arrow A2 in FIG. 8) is referred to as a rearward direction, a leftward direction from the operator (direction to the near side in FIG. 8) is referred to as a leftward direction, and a rightward direction from the operator (direction to the far side in FIG. 8) is referred to as a rightward direction. A horizontal direction orthogonal to front-rear direction K1 is referred to as a machine body width direction. A rightward or leftward direction from the widthwise center of the machine body 2 is referred to as a machine body outward direction. In other words, a machine body outward direction is one of the machine body width directions that goes away from the widthwise center of the machine body 2. A direction opposite to the machine body outward direction is referred to as a machine body inward direction. In other words, a machine body inward direction is one of the machine body width directions that approaches the widthwise center of the machine body 2.

As illustrated in FIG. 8, the traveling device 3 includes a traveling body 3L provided on the left side and a traveling body 3R provided on the right side. The traveling body 3L and the traveling body 3R are each a crawler traveling device including a driving wheel 11*a*, an idler wheel 11*b*, track rollers 11*e*, a frame 11*c* to rotatably support the driving wheel 11*a*, the idler wheel 11*b*, and the track rollers 11*e*, and a belt 11*d* around the driving wheel 11*a*, the idler wheel 11*b*, and the track rollers 11*e*. The frame 11*c* of the traveling body 3L has a first travel motor ML supported thereon. Power from the first travel motor ML is transmitted to the driving wheel 11*a* of the traveling body 3L. The frame 11*c* of the traveling body 3R has a second travel motor MR supported thereon. Power from the second travel motor MR is transmitted to the driving wheel 11*a* of the traveling body 3R.

A dozer device 7 is attached to a front portion of the traveling device 3. The dozer device 7 is configured to ascend and descend (raise and lower a blade) upon the extension and retraction of a dozer cylinder. Note that the working machine 1 may not include the dozer device 7.

The machine body 2 is supported on the traveling device 3 via a swivel bearing 8 such that the machine body 2 is rotatable about a vertical axis (axis extending in the up-and-down direction). The machine body 2 is driven to rotate by a swivel motor MT including a hydraulic motor (hydraulic actuator). The machine body 2 includes a swivel base plate 9 which rotates about a vertical axis, and a weight 10. The swivel base plate 9 is made of, for example, sheet steel, and is connected to the swivel bearing 8. The weight 10 is provided at a rear portion of the machine body 2. The machine body 2 contains a prime mover 20 in a rear portion thereof. The prime mover 20 is, for example, a diesel engine. Note that the prime mover 20 may be an electric motor or a hybrid prime mover including both a diesel engine and an electric motor.

The machine body 2 has a support bracket 13 at a front portion thereof such that the support bracket 13 is somewhat displaced rightward from the widthwise center of the machine body 2. The support bracket 13 has attached thereto a swing bracket 14 such that the swing bracket 14 is swingable about a vertical axis (axis extending in the up-and-down direction). The swing bracket 14 has the working device 4 attached thereto.

The working device 4 includes working bodies including, for example, a boom 15, an arm 16, and a bucket (working tool) 17. The proximal portion of the boom 15 is pivotally attached to the swing bracket 14 such that the boom 15 is pivotable about a lateral axis (axis extending in the machine body width direction). With this, the boom 15 is swingable up and down. The arm 16 is pivotally attached to the distal portion of the boom 15 such that the arm 16 is pivotable about a lateral axis. With this, the arm 16 is swingable forward and rearward and upward and downward. The bucket 17 is attached to the distal portion of the arm 16 such that the bucket 17 is capable of shoveling and dumping. The working machine 1 can have attached thereto some other working tool (auxiliary attachment) that can be driven by a hydraulic actuator instead of or in addition to the bucket 17. Examples of such other working tool (auxiliary attachment) include hydraulic breakers, hydraulic crushers, angle brooms, earth augers, pallet forks, sweepers, mowers, and snow blowers.

The swing bracket 14 is swingable upon extension and retraction of a swing cylinder C2 in the machine body 2. The boom 15 is swingable upon extension and retraction of a boom cylinder C3. The arm 16 is swingable upon extension and retraction of an arm cylinder C4. The bucket 17 is capable of shoveling and dumping upon extension and retraction of a bucket cylinder (working tool cylinder) C5. The dozer cylinder, the swing cylinder C2, the boom cylinder C3, the arm cylinder C4, and the bucket cylinder C5 are each a hydraulic cylinder (hydraulic actuator).

Note that the working device 4 need only be provided on the machine body 2, and may include element(s) other than the boom 15, the arm 16, and the bucket (working tool) 17. The boom cylinder C3, the arm cylinder C4, the bucket cylinder C5, and the like are each a hydraulic actuator to drive the working device 4.

As illustrated in FIG. 1, the working machine 1 includes a controller 60, a communicator 61, and a position detector 62. The controller 60 includes a central processing unit (CPU) to execute instructions of program(s), one or more read only memories (ROM) storing computer program(s), one or more random access memories (RAM) in which control programs are loaded, storing unit(s) (one or more recording media) such as one or more memories storing control programs and data, and/or the like. The controller 60 performs various types of control concerning the working machine 1. For example, the controller 60 controls, for example, control valves (not illustrated) to control the swing cylinder C2, boom cylinder C3, arm cylinder C4, bucket cylinder C5 (performs hydraulic pressure control) and controls the rotation speed of the prime mover 20 according to the operation of operation member(s) (manual operator(s), not illustrated) provided in the working machine 1.

The communicator 61 is a communicator (communication module) to communicate directly or indirectly with external equipment (not illustrated). The communicator 61 is capable of performing wireless communication via, for example, wireless fidelity (Wi-Fi, registered trademark) which is an IEEE802.11 standard, Bluetooth (registered trademark) Low Energy (BLE), Low Power, Wide Area (LPWA), Low-Power Wide-Area Network (LPWAN), or the like which are communication standards. The communicator 61 may be a communicator (communication module) which performs wireless communication over a mobile telephone communication network or a data communication network.

The position detector 62 detects the position (measured position information including latitude and longitude) thereof using a satellite positioning system. Specifically, the position detector 62 receives radio wave(s) (signal(s)) transmitted from positioning satellite(s) (not illustrated), and detects the position thereof (latitude, longitude) based on signal(s) (signal(s) indicating the position(s) of positioning satellite(s), time of transmission, correction information etc.) superimposed on the received radio wave(s).

The position detector 62 may receive signal(s) transmitted from a base station (reference station, not illustrated) which can receive radio waves from positioning satellite(s) and detect, as the position thereof (latitude, longitude), the position corrected based on the correction information indicated by the received signal(s). The position detector 62 may include inertial measurement unit(s) such as a gyroscope sensor and/or an acceleration sensor and detect, as the position thereof, a position corrected using the inertial measurement unit. The position detector 62 is provided in or on the working machine 1, and therefore the position determined by the position detector 62 can be regarded as the position of the working machine 1 (machine body position). That is, the position detector 62 determines the position of the working machine 1.

The monitoring system 200 includes an area setter 100 and a monitoring device 101. The area setter 100 is provided in a stationary computer such as a server or a personal computer installed at a predetermined location, a portable computer such as a tablet, a smartphone, or a laptop computer, or the like. In the present embodiment, the area setter 100 is provided in a portable terminal 102 which is a portable computer. The area setter 100 includes software program(s) or hardware included in the portable terminal 102.

The monitoring device 101 is a stationary computer such as a server or a personal computer installed at a predetermined location, a portable computer, or the like. In the present embodiment, the monitoring device 101 is a server. The monitoring device 101 is an example of a monitor to monitor the working machine 1.

Note that the monitor may include, for example, software program(s) or application program(s) provided in an electronic device or may include application program(s) on the cloud, instead of an electronic device such as the monitoring device 101. The area setter 100 may include an electronic device or may include application program(s) in the cloud. The area setter 100 may be provided in the monitoring device 101.

The portable terminal 102 includes a display 103 including an organic EL, liquid crystal panel, or the like, and a memory 104 including one or more nonvolatile memories and/or the like, in addition to the area setter 100. The display 103 displays various information. The memory 104 stores, for example, various information such as map information.

Figure 2:
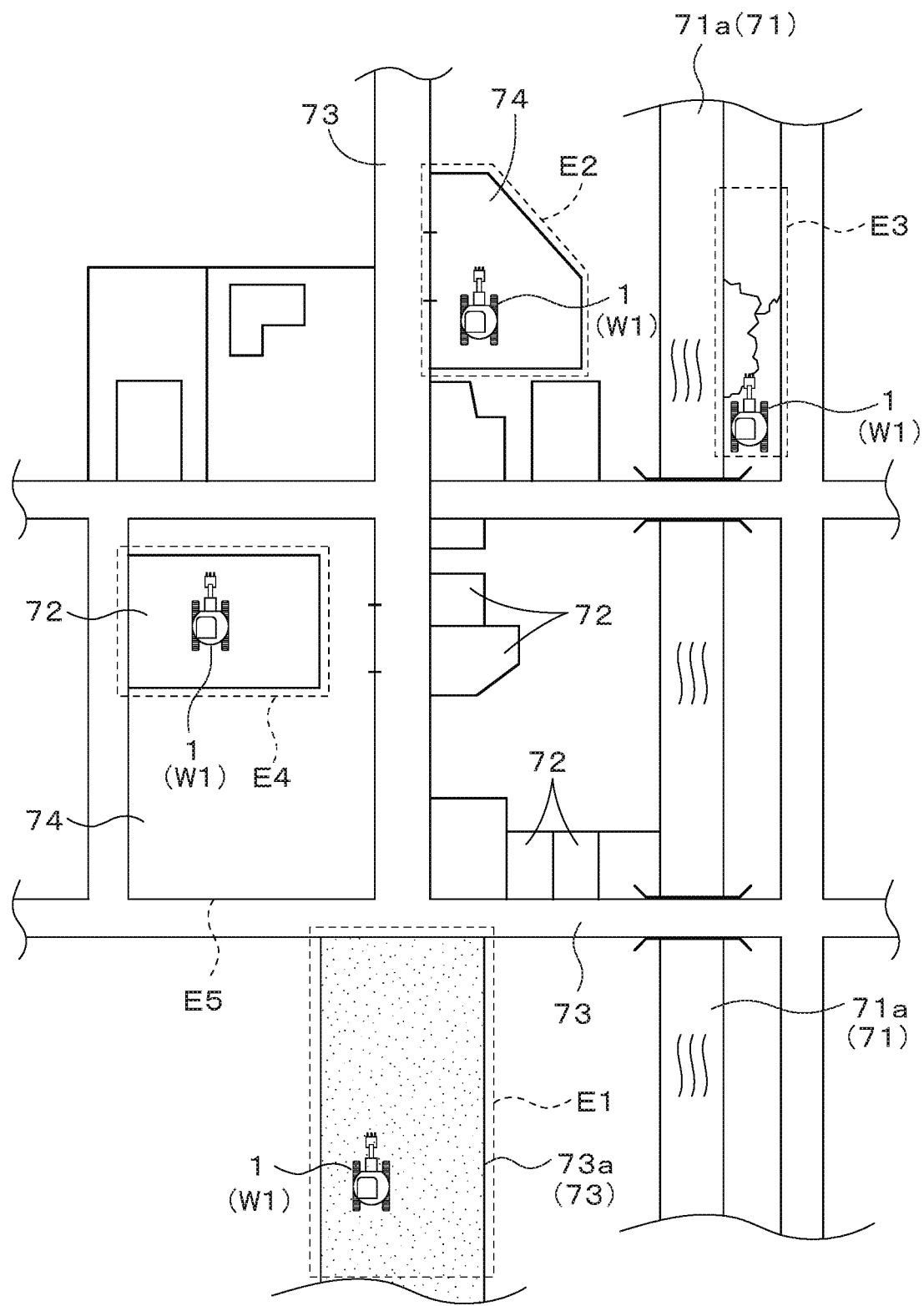
FIG. 2 illustrates an example of map information and work areas.

The memory 104 stores, as map information, information relating to the shape(s) and position(s) of geographic feature(s) 71 such as river(s) 71a, mountain(s), valley(s), lake(s), and/or forest(s), structure(s) 72 such as residence(s) and/or building(s), architectural structure(s) (building structure(s)) such as road(s) 73, park(s), steel tower(s), utility pole(s), and/or land 74, and/or the like, as illustrated in FIG. 2. The memory 104 also stores information relating to road(s) 73 under construction and/or land 74 under construction. The map information may be, but not limited to, map information acquired from a map provider which provides maps or map information prepared by a manager or a user etc. of the working machine 1.

The area setter 100 includes electric/electronic circuit(s) provided in the portable terminal 102, software program(s) stored in the memory 104 of the portable terminal 102, and/or the like. The area setter 100 sets work area(s) in which work is to be done by the working machine 1, based on the content of work done by the working machine 1 (hereinafter may be referred to as "work content") and map information.

Specifically, for example, upon a predetermined operation by a manager or user etc. of the working machine 1 via an interface (not illustrated) such as an operation key, a touch pad, and/or a microphone of the portable terminal 102, the area setter 100 causes the display 103 to display an area settings screen M1 as illustrated in FIG. 3. In so doing, the area setter 100 refers to the memory 104, reads map information stored in the memory 104, and causes the display 103 to display the map information on the area settings screen M1. Note that the map information does not need to be stored in the memory 104 of the portable terminal 102, may be acquired by the portable terminal 102 from external equipment via communication when needed.

The area settings screen M1 includes a map display section 110 in which map information is displayed, a date input field 111 in which the date(s) on which work is to be done by the working machine 1 is inputted, a time input field 112 in which the period of time for which work is to be done is inputted, and a work input field 113 in which work content is inputted. The map display section 110 is capable of displaying a map included in the map information read from the memory 104.

A machine body position W1 determined by the position detector 62 of the working machine 1 is transmitted to the portable terminal 102 or the monitoring device 101 via the communicator 61 at predetermined intervals. The portable terminal 102 acquires (receives) the machine body position W1 from the communicator 61 or the monitoring device 101 at predetermined intervals. Upon acquisition of the machine body position W1, the area setter 100 extracts map information about the machine body position W1 and the vicinity thereof from map information stored in the memory 104, and causes the display 103 to display the map indicated by the map information and the machine body position W1 in the map display section 110. That is, the map display section 110 can display the machine body position W1 and a map of an area at and around the working machine 1 including the machine body position W1.

The range of the map displayed in the map display section 110 can be changed by operating an interface of the portable terminal 102. Once the machine body position W1 and the map of the area at and around the machine body position W1 have been displayed in the map display section 110, the area setter 100 causes the display 103 to update the displayed machine body position W1 in the map display section 110 upon acquisition of each of machine body positions W1 acquired at predetermined intervals.

By operating an interface of the portable terminal 102, it is possible to input date, month, and year etc. indicating the date(s) on which work is to be done (hereinafter may be referred to as "work date(s)") into the date input field 111, possible to input work start time, work end time, and/or work period etc. into the time input field 112, and possible to input work content such as road construction, indoor construction, outdoor construction, or river construction into the work input field 113.

Assume that the user etc. inputs the work date(s), work period, work content and/or the like on the area settings screen M1 and then selects an OK button 114. Upon the selection, the area setter 100 refers to the machine body position indicating the position of the working machine 1 at the point in time at which the OK button 114 was selected (which may be referred to as "selected machine body position") W1 and map information about the selected machine body position W1 and its vicinity, and extracts, from this map information, narrower map information about the selected machine body position W1 and its vicinity. Next, if there is a relationship between the map information about the selected machine body position W1 and its vicinity and the work content (road construction, indoor construction, outdoor construction, river construction) of the working machine 1 inputted in the work input field 113, the area setter 100 performs settings of work area(s) E1 to E4 on the map displayed in the map display section 110.

Specifically, for example, if the area setter 100 determines based on the map information about the selected machine body position W1 and its vicinity that there is a non-blocking object such as a river 71a, a valley, a lake, a road 73, a park, a steel tower, a utility pole, and/or land 74 in the vicinity of the selected machine body position W1 and that the work content of the working machine 1 relates to the construction of the non-blocking object, the area setter 100 sets, as a work area, an area including the non-blocking object and the selected machine body position W1.

Note that a non-blocking object is an object such as a structure, a natural object, or the like object which does not block positioning radio waves transmitted from positioning satellite(s) to a predetermined extent or more. In contrast, a blocking object is an object such as a structure, a natural object, or the like object which blocks positioning radio waves transmitted from positioning satellite(s) to a predetermined extent or more. Examples of a blocking object include structures such as mountains, forests, residences, and buildings.

For example, if the area setter 100 determines that a road 73a and the selected machine body position W1 overlap each other as shown in a lower portion of FIG. 2 and that the work content of the working machine 1 is a road construction, the area setter 100 sets an area at and around the road 73a as a work area E1 in which the road construction is to be performed. Note that the size (width, length) of the work area E1 may be preset. Alternatively, for example, the width and length of the work area E1 displayed in the map display section 110 (FIG. 3) of the area settings screen M1 may be changeable by operating an interface of the portable terminal 102. The sizes of other work areas may be set and/or changed in the same manner. The method of setting the size of a work area is not limited as those described above.

If the area setter 100 determines that the selected machine body position W1 does not overlap any structure 72 but overlaps land 74 as shown in an upper middle portion of FIG. 2 and that the work content of the working machine 1 is outdoor construction, the area setter 100 sets, as a work area E2 in which the outdoor construction is to be performed, an area enclosed by the outline (boundary) of the land 74.

If the area setter 100 determines that the selected machine body position W1 is present in the vicinity of the river 71a as shown in an upper right portion of FIG. 2 and that the work content of the working machine 1 is river construction, the area setter 100 sets, as a work area E3 in which the river construction is to be performed, a bank of the river 71a (which may also include the river 71a) in the vicinity of the selected machine body position W1, for example.

On the contrary, if the area setter 100 determines that there is a blocking object such as a mountain, a forest, and/or a structure in the vicinity of the selected machine body position W1 and that the work content of the working machine 1 relates to a construction relating to the blocking object, the area setter 100 sets, as a work area, an area including the blocking object. For example, if the area setter 100 determines that the selected machine body position W1 overlaps a structure 72 which is a blocking object as shown in a left portion of FIG. 2 and that the work content of the working machine 1 is indoor construction, the area setter 100 sets an area occupied by the structure 72 as a work area E4 in which the indoor construction is to be performed.

As describe above, the area setter 100 compares the selected machine body position W1 at the point in time at which the work content of the working machine 1 and the like were selected on the area settings screen M1, the map information about the selected machine body position W1 and its vicinity (a river 71a, a mountain, a valley, a lake, a forest, a structure 72 such as a residence or a building, a road 73, a park, a steel tower, a utility pole, land 74), and work content, and, if there is a relationship between the selected machine body position W1, the map information, and the work content, the area setter 100 automatically sets work area(s) E1 to E4.

The area setter 100 determines whether or not there is/are blocking object(s) in the vicinity of the work area(s) E1 to E4 based on the map information about the selected machine body position W1 and its vicinity to determine whether the work area(s) E1 to E4 is/are in a shielded environment (in which radio waves from positioning satellite(s) are likely to be blocked) or an unshielded environment (in which radio waves from positioning satellite(s) are unlikely to be blocked). Specifically, for example, the area setter 100 determines that the work area E4, in which there is a blocking structure (structure 72) as describe earlier, is in the shielded environment. The area setter 100 determines that the work areas E1 to E3, in which there are no blocking structures as described earlier, is in the unshielded environment.

Next, the area setter 100 sets (prepares) work area information indicating the set work areas E1 to E4, the positions (latitude, longitude) of the work areas E1 to E4, and whether the work areas E1 to E4 are in the shielded environment or the unshielded environment, and causes the memory 104 to store the work area information. The area setter 100 also sets work information indicating the positions of the set work areas E1 to E4, the inputted work date(s), work period, work content and/or the like, and causes the memory 104 to store the work information. The area setter 100 causes the portable terminal 102 to transmit the work area information and the work information stored in the memory 104 to the monitoring device 101.

In the above embodiment, the work areas E1 to E4 are automatically set. However, the user or the like may manually set the work area(s) E1 to E4 using an interface of the portable terminal 102. In such a case, for example, the area setter 100 first causes the selected machine body position W1 to be displayed on the map displayed in the map display section 110 of the area settings screen M1. The manager or user etc. operates an interface of the portable terminal 102 to designate an area (for example, an area corresponding to the work content) including the selected machine body position W1 on the map displayed in the map display section 110 of the area settings screen M1, and selects the OK button 114. With this, the area setter 100 sets the designated area as a work area.

The area setter 100 may determine whether or not the area designated by the user or the like agrees with the work content of the working machine 1 inputted in the work input field 113, and set a work area depending on the result of the determination. Specifically, if the area setter 100 determines that the designated area agrees with the work content of the working machine 1 inputted in the work input field 113, the area setter 100 sets the designated area as a work area.

If the area setter 100 determines that the area designated by the user or the like does not agree with the work content of the working machine 1, the area setter 100 does not set the designated area as a work area. For example, if an area not including any structure 72 is designated by the user or the like even though the work content is indoor construction or if an area not including any road 73 is designated by the user or the like even though the work content is road construction, the area setter 100 does not set the designated as a work area. In such cases, the area setter 100 may cause the area settings screen M1 to display a warning (such as a message) indicating that the designated area does not agree with the work content and therefore cannot be set as a work area.

Upon acquisition (receipt) of the work area information and the work information set at the portable terminal 102, the monitoring device 101 monitors the working machine 1. In so doing, the monitoring device 101 acquires (receives), at predetermined intervals, the machine body position W1 determined by the position detector 62 of the working machine 1 and transmitted from the communicator 61, and associates the machine body position W1 with pre-acquired map information. The monitoring device 101 determines whether or not the machine body position W1 is in the work area(s) E1 to E4 indicated by the work area information.

For example, if the monitoring device 101 determines that the machine body position W1 is in one of the work areas E1 to E4 and then determines that the machine body position W1 has been outside the one of the work areas E1 to E4 for a predetermined period or more, the monitoring device 101 determines that the working machine 1 is located outside the one of the work areas E1 to E4 and is distant from that one of the work areas E1 to E4. If the monitoring device 101 determines that the machine body position W1 is located in one of the work areas E1 to E4 and then determines that the machine body position W1 is located at a predetermined distance or more from the one of the work areas E1 to E4, the monitoring device 101 determines that the working machine 1 is located outside the one of the work areas E1 to E4 and is distant from the one of the work areas E1 to E4. The monitoring device 101 then provides a notification (warning) indicating the result of the determination.

Specifically, the monitoring device 101 transmits, to the portable terminal 102 and/or the controller 60 of the working machine 1, a notification signal indicating that the working machine 1 is located outside the one of the work areas E1 to E4 and distant from the one of the work areas E1 to E4. Upon receipt of the notification signal, the portable terminal 102 causes the display 103 and/or the like to provide a notification (warning) based on the notification signal. In so doing, for example, at the portable terminal 102, the content indicated by the notification signal or a message indicating a warning and/or the like may be displayed on the screen of the display 103. Alternatively, the content indicated by the notification signal, warning sound, or audio indicating a warning may be outputted (displayed) from a speaker or the like of the portable terminal 102.

The controller 60 of the working machine 1, upon receipt of the notification signal, causes a display and/or the like of the working machine 1 to provide a notification (warning) based on the notification signal. In so doing, the content indicated by the notification signal or a message indicating a warning and/or the like may be displayed on the screen of the display of the working machine 1. Alternatively, the content indicated by the notification signal, warning sound, or audio indicating a warning may be outputted (displayed) from a speaker or a beeper or the like of the working machine 1.

With this, under the circumstances in which the machine body position W1 is detectable by the position detector 62, i.e., under the circumstances in which the machine body position W1 can be determined, even if the working machine 1 is taken away from the work areas E1 to E4 while the working machine 1 is not doing work, the notification is provided by the monitoring device 101, the portable terminal 102, and/or the working machine 1, making it possible to attract attention of the user and/or the like and people around the working machine 1 to prevent or reduce the likelihood that the working machine 1 will be stolen.

Figure 5:
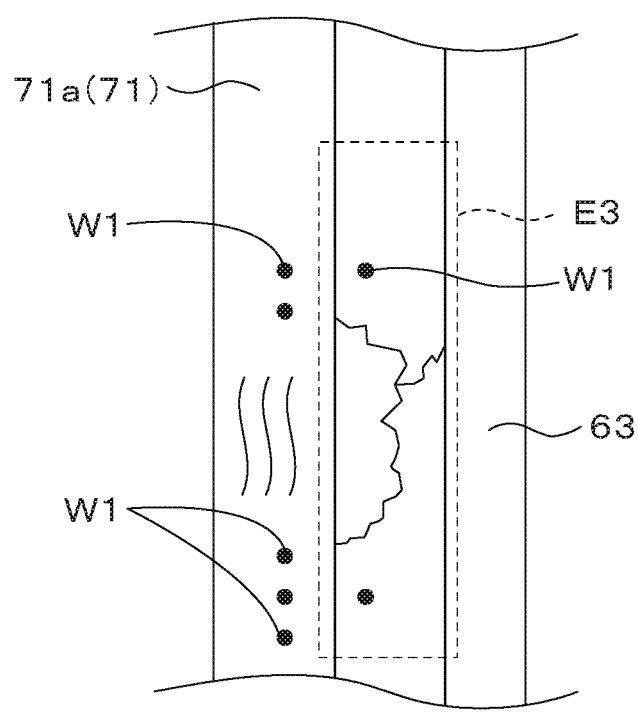
FIG. 5 illustrates an example in which a machine body position is indicated at a location where the working machine is not reachable.

The monitoring device 101 may be configured such that, if determining that at least one of a plurality of the machine body positions W1 acquired from the communicator 61 of the working machine 1 at predetermined intervals is at a location not reachable by the working machine 1 (unreachable location), the monitoring device 101 does not provide a notification even if the machine body position W1 is located outside the work areas E1 to E4. Specifically, the monitoring device 101 checks each of the acquired machine body positions W1 against the map information (i.e., associates the acquired machine body positions W1 with the map information) and, if at least one of the machine body positions W1 is located at a river 71a which is an unreachable location as shown in, for example, FIG. 5, the monitoring device 101 does not determine whether or not that machine body position W1 is in the work area E3. With this, no notification is provided by the monitoring device 101 or the like.

While the monitoring device 101 is monitoring the working machine 1, the communicator 61 transmits the results of determining the position of the machine body position W1 by the position detector 62 at predetermined intervals, and the monitoring device 101 acquires the results. The monitoring device 101 evaluates the state of position determination by the position detector 62 based on the work area information and the result of position determination by the position detector 62.

As described earlier, the work area information indicates the work areas E1 to E4 and whether each of the work areas E1 to E4 is in the shielded environment or in the unshielded environment. Therefore, the monitoring device 101 determines whether the work area in which the machine body position W1 is located is in the shielded environment or the unshielded environment based on the work area information, and, evaluates (estimates) the state of position determination by the position detector 62 based on the result of the determination. That is, the monitoring device 101 evaluates the state of position determination by the position detector 62 corresponding to the work area information about the work area in which the machine body position W1 is located.

If the strength of received radio waves from the positioning satellite(s) is high and the position detector 62 successfully determines the machine body position W1, the result of position determination by the position detector 62 includes the machine body position W1 and the strength of received radio waves (received signal strength indicator, RSSI) measured by the position detector 62. In contrast, if the strength of received radio waves from the positioning satellite(s) is low and the position detector 62 fails to determine the machine body position W1, the result of position determination by the position detector 62 does not include the machine body position W1 and only includes the strength of received radio waves measured by the position detector 62. Therefore, the monitoring device 101 evaluates the state of position determination by the position detector 62 obtained when the position detector 62 actually determined or tried to determine the machine body position W1, based on the strength of the received radio waves included in the result of position determination by the position detector 62.

For example, as illustrated in FIG. 2, in the case where the machine body position W1 is located in one of the work areas E1 to E3 in which there are no blocking objects or the like in the vicinity thereof, the monitoring device 101 determines that the one of the work areas E1 to E3 is in the unshielded environment based on the work area information, and evaluates the sensitivity of the position determination, which is the state of position determination by the position detector 62, as being high.

In the case where the machine body position W1 is located in one of the work areas E1 to E3 in which there are no blocking objects or the like in the vicinity thereof, the position detector 62 is likely to receive radio waves from the positioning satellites, and therefore the strength of radio waves received by the position detector 62 is high. The monitoring device 101 here regards, as the sensitivity of position determination, the strength of received radio waves included in the result of position determination by the position detector 62, and evaluates the sensitivity of the position determination, which is the state of position determination by the position detector 62 obtained when the position detector 62 actually determined the machine body position W1, as being higher than a predetermined value G1, as shown in time period T1 in FIG. 4A.

After that, for example, if the position detector 62 becomes less likely to receive radio waves from the positioning satellite(s) because, for example, the working machine 1 is taken out of the one of the work areas E1 to E3 in which the working machine 1 was working to a location in the shielded environment, the sensitivity of the actual position determination by the position detector 62 drops below the predetermined value G1, as indicated by time point P1 in FIG. 4A.

Thus, if there is a predetermined change in the actual state of position determination in one of the work areas E1 to E3 evaluated based on the result of position determination by the position detector 62 compared to the state of position determination by the position detector 62 corresponding to the work area information of the one of the work areas E1 to E3 as described above, the monitoring device 101 transmits, to the portable terminal 102 or the controller 60, a notification signal indicating that the working machine 1 is distant from the one of the work areas E1 to E3 in which the working machine 1 was working.

For another example, the monitoring device 101 may determine whether or not the working machine 1 is being driven by communicating with the controller 60 via the communicator 61 and then determine whether there is a change in the sensitivity of actual position determination of the machine body position W1 by the position detector 62. In such a case, the monitoring device 101 may determine that the working machine 1 is being drive and then, if the sensitivity of the actual position determination by the position detector 62 decreases below the predetermined value G1 as shown in time period T2 starting from time point P1 in FIG. 4A, transmit a notification signal to the portable terminal 102 and/or the controller 60.

On the contrary, for example, if the machine body position W1 is located in the work area E4 in which a blocking object and/or the like is present in the vicinity thereof (surrounded by a structure 72 which is a blocking object) as shown in FIG. 2, the monitoring device 101 determines that the work area E4 is in the shielded environment based on the work area information and evaluates the sensitivity of position determination, which is the state of position determination by the position detector 62, as being low.

Furthermore, because the position detector 62 is unlikely to receive radio waves from the positioning satellite(s), the strength of radio waves received by the position detector 62 is low. The monitoring device 101 here evaluates the sensitivity of position determination, which is the state of position determination by the position detector 62 obtained when the position detector 62 actually determined the machine body position W1, as being lower than the predetermined value G1 based on the strength of received radio waves included in the result of position determination by the position detector 62, as shown in time period T3 in FIG. 4B.

After that, for example, if the position detector 62 becomes more likely to receive radio waves from the positioning satellite(s) because, for example, the working machine 1 is taken out of the work area E4 in which the working machine 1 was working to a location in the unshielded environment, the sensitivity of the actual position determination by the position detector 62 suddenly increases to the predetermined value G1 or above, as indicated by time point P2 in FIG. 4B. In such a case, the monitoring device 101 transmits, to the portable terminal 102 and/or the controller 60, a notification signal indicating that the working machine 1 is distant from the work area E4 in which the working machine 1 was working.

For another example, the monitoring device 101 may be configured such that, if the monitoring device 101 determines that the working machine 1 is being driven and then the sensitivity of actual position determination by the position detector 62 increases to the predetermined value G1 or above as indicated in time period T4 starting from time point P2 in FIG. 4B, the monitoring device 101 transmits a notification signal to the portable terminal 102 and/or the controller 60.

A monitoring system 200 for a working machine according to a first embodiment as discussed above includes: a position detector 62 to determine a position of a working machine 1 based on radio waves from one or more positioning satellites; an area setter 100 to set work area information indicating whether at least one work area E1 to E4 is in a shielded environment or an unshielded environment, the at least one work area E1 to E4 being at least one area in which work is to be done by the working machine 1, the shielded environment being an environment in which the radio waves are likely to be blocked, the unshielded environment being an environment in which the radio waves are unlikely to be blocked; and a monitor (monitoring device) 101 to evaluate a state of position determination by the position detector 62 based on a result of the position determination by the position detector 62, and provide a notification if there is a predetermined change in the evaluated state of the position determination compared to a state of position determination corresponding to the work area information.

With this, a notification is provided if there is a predetermined change in the state of position determination by the position detector 62 evaluated based on the result of position determination by the position detector 62, compared to the state of position determination by the position detector 62 corresponding to the work area information indicating whether each of the work area(s) E1 to E4 is in the unshielded environment or the shielded environment. This makes it possible to quickly notify a user or the like of the possibility that the working machine 1 may be stolen and thus possible to protect the working machine 1 from theft at, for example, a location where the working machine 1 does work.

In the first embodiment, the position detector 62 may be provided in or on the working machine 1. The area setter 100 may be configured or programmed to acquire content of the work to be done by the working machine 1 and map information about the position of the working machine 1 determined by the position detector 62 and a vicinity thereof, and set the work area information about the at least one work area E1 to E4 based on the content of the work and the map information. This makes it possible to set work area information indicating the work area(s) E1 to E4 which correspond(s) to the content of work done by the working machine 1 and the position of the working machine 1 and indicating whether the work area(s) E1 to E4 is in the shielded environment shielded from radio waves or the radio wave unshielded environment unshielded from radio waves. Furthermore, the state of position determination by the position detector 62 is regarded as the state of position determination at a location where the working machine 1 is present, and a notification is provided when there is a predetermined change in the state of position determination because of, for example, the working machine 1 being moved by a malicious third party, making it possible to protect the working machine 1 from theft.

In the first embodiment, the monitor 101 may be configured or programmed to evaluate a sensitivity of the position determination as being low if the work area E4 is in the shielded environment, the sensitivity of the position determination being the state of the position determination, and provide the notification if the sensitivity of the position determination by the position detector 62 changes from a value less than a predetermined value G1 to a value equal to or greater than the predetermined value G1. With this, the following is achieved. For example, under the circumstances in which the working machine 1 is located near a blocking object such as a structure, the sensitivity of position determination by the position detector 62 is low. In such circumstances, if the sensitivity of position detection by the position detector 62 increases from below the predetermined value G1 to the predetermined value G1 or above, it is possible to know that the working machine 1 is moved from the shielded environment near the blocking object such as a structure to a different location, making it possible to protect the working machine 1 from theft in the shielded environment.

In the first embodiment, the monitor 101 may be configured or programmed to evaluate a sensitivity of the position determination as being high if the work area E1 to E3 is in the unshielded environment, the sensitivity of the position determination being the state of the position determination, and provide the notification if the sensitivity of the position determination by the position detector 62 changes from a value equal to or greater than a predetermined value G1 to a value less than the predetermined value G1. With this, the following is achieved. For example, under the circumstances in which the working machine 1 is located in an unshielded environment on the road or near a river or the like, the sensitivity of position determination by the position detector 62 is high. In such circumstances, if the sensitivity of position determination by the position detector 62 decreases below the predetermined value G1 from the predetermined value G1 or above, it is possible to know that the working machine 1 is being moved from the unshielded environment such as the road or the vicinity of the reiver to another location, making it possible to protect the working machine 1 from theft in the unshielded environment.

In the first embodiment, the monitor 101 may be configured or programmed to provide the notification if the working machine 1 is driven and the sensitivity of the position determination by the position detector 62 changes from a value equal to or greater than the predetermined value G1 to a value less than the predetermined value G1. This makes it possible to quickly know that the working machine 1 is being driven and traveling to move away from the work area(s).

In the first embodiment, the area setter 100 may be configured or programmed to acquire map information indicating whether or not there is a blocking object to block the radio waves in the at least one work area E1 to E4, and content of the work to be done by the working machine 1, and if there is a blocking object in the at least one work area and the content of the work relates to construction in the shielded environment, set the work area information indicating that the at least one work area is in the shielded environment. This makes it possible to easily set the work area information indicating the work area corresponding to the construction performed in the shielded environment and the environment of the work area.

In the first embodiment, the area setter 100 may be configured or programmed to acquire map information indicating whether or not there is a blocking object to block the radio waves in the at least one work area E1 to E4, and content of the work to be done by the working machine 1, and if there is no blocking object in the at least one work area and the content of the work relates to construction in the unshielded environment, set the work area information indicating that the at least one work area is in the unshielded environment. This makes it possible to easily set the work area information indicating the work area corresponding to the construction performed in the unshielded environment and the environment of the work area.

In the first embodiment, the monitor 101 may be configured or programmed to associate the position of the working machine 1 determined by the position detector 62 with map information, and not provide the notification if the position associated with the map information is at a location indicated by the map information and unreachable by the working machine 1. With this, no notification is provided when the position W1 of the working machine 1 (machine body position) determined by the position detector 62 is located at, for example, a river which is unreachable by the working machine 1, making it possible to prevent or reduce unnecessary notifications that would otherwise result from positioning errors of the position detector 62.

Second Embodiment

In a second embodiment, the monitoring device 101 provides a notification (warning) based on the degree of fluctuation which is the degree to which the machine body position W1 determined by the position detector 62 fluctuates into and out of the work area(s) E1 to E4. In the second embodiment, the features similar to those of the first embodiment are not described.

The monitoring device 101 acquires, from the communicator 61, the machine body position(s) W1 determined by the position detector 62 of the working machine 1, and determines whether or not to transmit a notification signal to the portable terminal 102 and/or the controller 60 of the working machine 1 based on the machine body position(s) W1.

Figure 6:
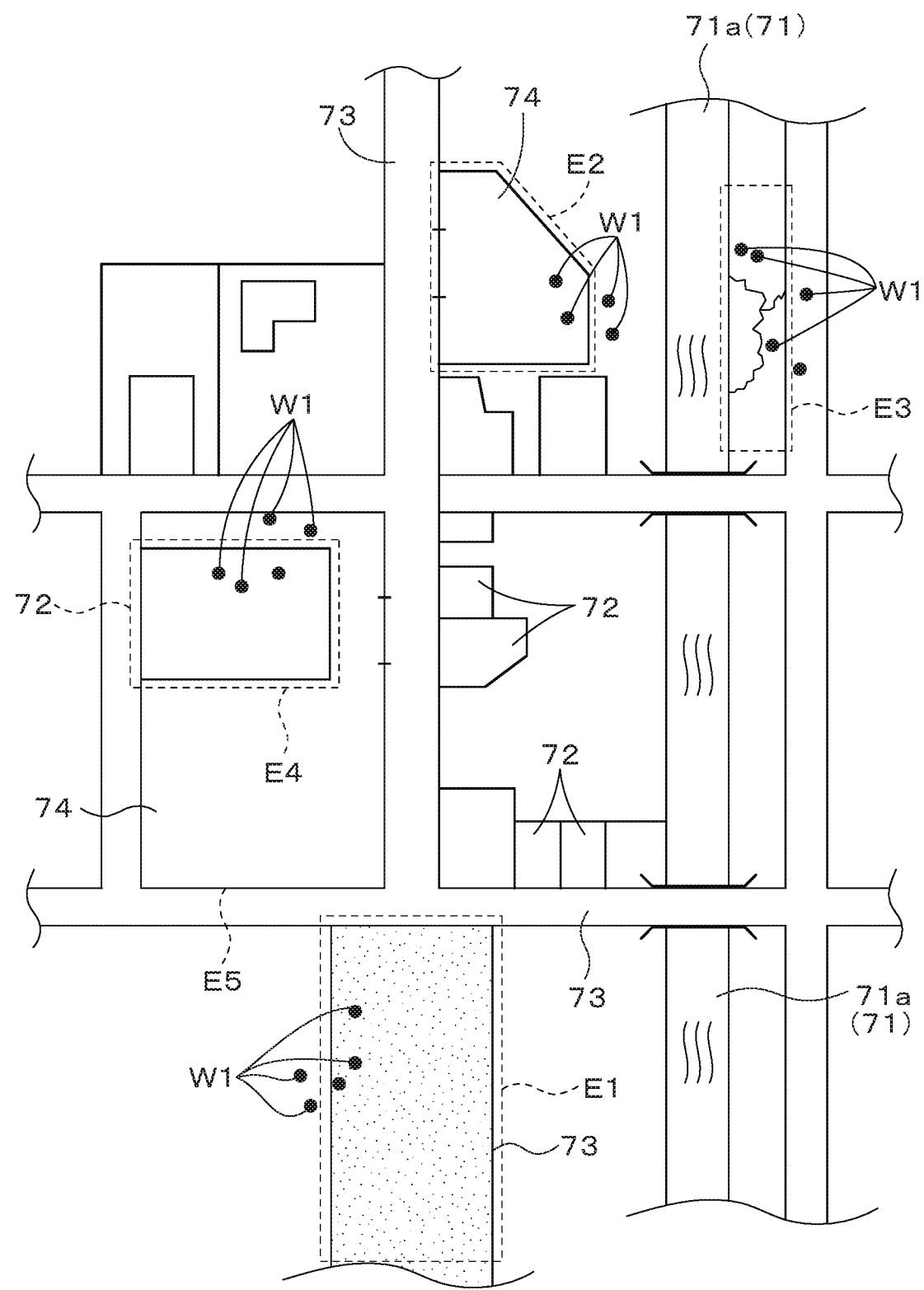
FIG. 6 illustrates changes in machine body positions at work areas.

FIG. 6 shows changes in machine body positions W1 regarding the work areas E1 to E4. There may be cases in which the machine body position W1 determined by the position detector 62 at predetermined intervals fluctuates like, as shown in FIG. 6, moving into and out of the work areas E1 to E4. The monitoring device 101, in monitoring the working machine 1, calculates the degree of fluctuation of the machine body position W1 into and out of the work areas E1 to E4.

Figure 7:
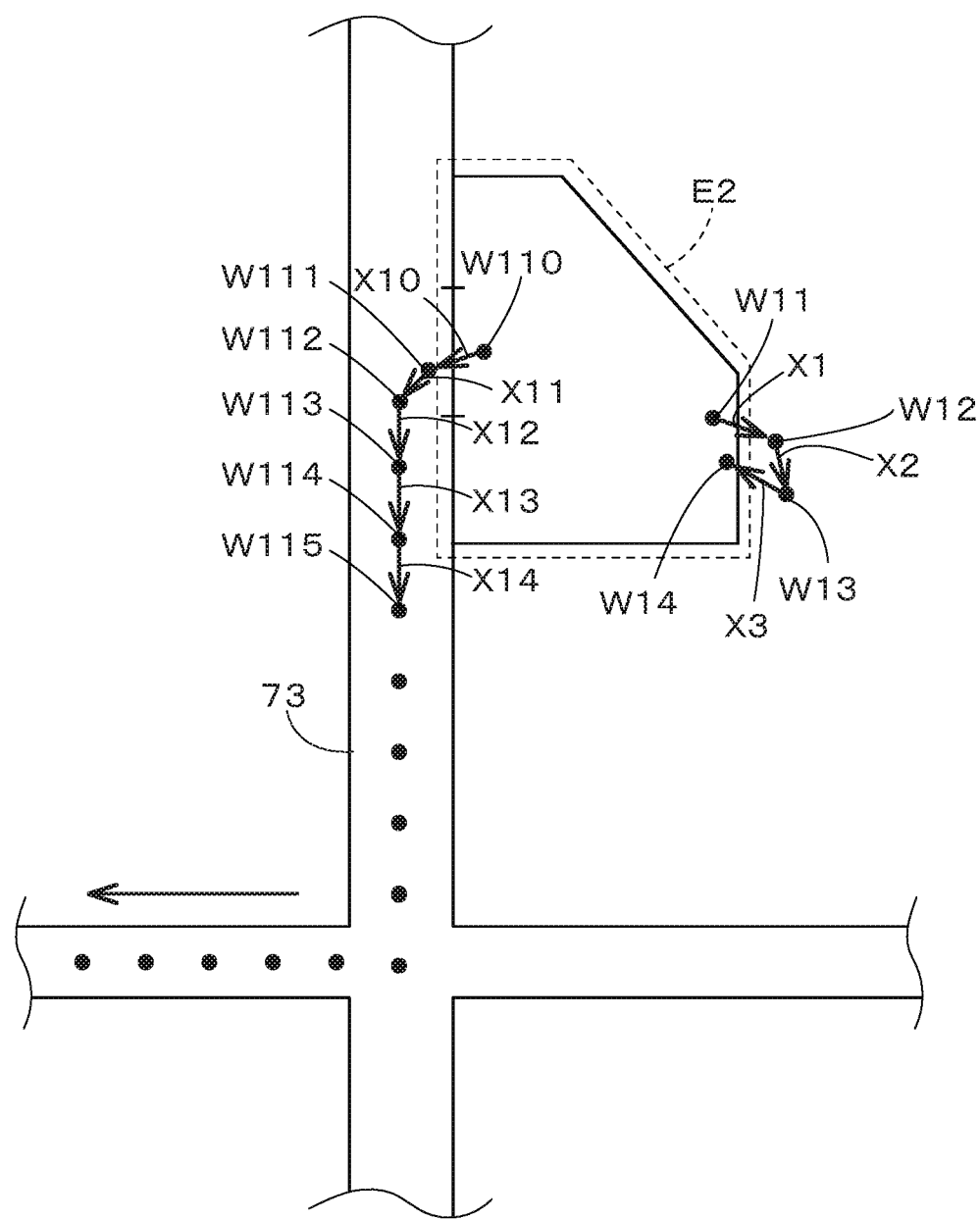
FIG. 7 illustrates how to determine the direction of travel of a working machine.

For example, the monitoring device 101 determines, as the degree of fluctuation of the machine body position W1, direction(s) of travel of the working machine 1 (orientation of the working machine) from a plurality of machine body positions W1$i$ (i (i=1, 2, 3, 4 . . . ): the number in the order in which the machine body positions were determined) determined at predetermined intervals. In the case where the monitoring device 101 acquires machine body positions W11, W12, W13, and W14 shown in FIG. 7 in the order in which the positions were determined, the monitoring device 101 determines a vector pointing from the machine body position W11 toward the machine body position W12 as being a traveling direction X1 of the working machine 1, determines a vector pointing from the machine body position W12 toward the machine body position W13 as being a traveling direction X2 of the working machine 1, and determines a vector pointing from the machine body position W13 toward the machine body position W14 as being a traveling direction X3 of the working machine 1. The monitoring device 101 refers to the traveling directions X1 to X3, and if the monitoring device 101 determines that there is a continuous change in orientation of the traveling directions X1 to X3 and the traveling directions X1 to X3 differ in orientation from each other, the monitoring device 101 determines that the degree of fluctuation is equal to or greater than a predetermined value. Specifically, if the orientation of the traveling directions X1 to X3 reverses within a short period of time and/or the traveling directions X1 to X3 continue to differ from each other, the machine body position W1 moves into and out of the work area E2 within a short period of time; therefore, the monitoring device 101 determines that the degree of fluctuation is high and is the predetermined value or greater. In the case where the degree of fluctuation is equal to or greater than the predetermined value as such, the monitoring device 101 does not transmit a notification (warning) to the portable terminal 102 or the controller 60 (does not provide a notification) even if the monitoring device 101 determines that the machine body position W1$i$ is located outside the work area E2.

On the other hand, in the case where the monitoring device 101 receives machine body positions W110 to W115 in the order in which the positions were determined, the monitoring device 101 determines the vectors between the machine body positions W110 to W115 as being traveling directions X10 to X14 of the working machine 1 in the order in which the positions were determined, in the same manner as described above. The monitoring device 101 refers to the traveling directions X10 to X14 of the working machine 1 and, if the monitoring device 101 determines that the traveling direction X10 and the traveling direction X11 differ in orientation but the sequential traveling directions X12 to X14 are equal in orientation, the monitoring device 101 determines that the degree of fluctuation is low and is less than the predetermined value. In the case where the degree of fluctuation is less than the predetermined value as such, the monitoring device 101 transmits a notification signal (provides a notification) to the portable terminal 102 and/or the controller 60 upon determining that the machine body position W1$i$ is located outside the work area E2.

For another example, the monitoring device 101 may be configured such that, when the monitoring device 101 is monitoring the working machine 1, the monitoring device 101 determines whether or not the working machine 1 is being driven and, if the working machine 1 is not driven and the traveling direction of the working machine 1 does not change by a predetermined degree or more for a period of time or more, the monitoring device 101 transmits a notification signal to the portable terminal 102 and/or the controller 60. Note that the monitoring device 101 does not transmit a monitoring device 101 in other cases.

The monitoring device 101 may be configured such that the monitoring device 101 transmits a notification signal to the portable terminal 102 and/or the controller 60 if, when the monitoring device 101 refers to the traveling directions X10 to X14 of the working machine 1, the vectors indicating the traveling directions X10 to X14 point away from any of the work areas E1 to E4 for a period of time or more. Note that the monitoring device 101 does not transmit a notification signal in other cases.

The monitoring device 101 may be configured such that the monitoring device 101 transmits a notification signal to the portable terminal 102 and/or the controller 60 if the machine body position W1$i$ determined by the position detector 62 is at a predetermined distance or more from any of the work areas E1 to E4. The predetermined distance in such a case may be a distance that ensures reliable detection of the actual location of the working machine 1 outside the work areas E1 to E4 and that depends on, for example, the accuracy of position determination by the position detector 62. Note that the monitoring device 101 does not transmit a notification signal in other cases.

The monitoring device 101 may be configured such that the monitoring device 101 determines the speed of travel of the working machine 1 based on the change (moved distance) in the machine body position W1$i$ per unit time and, if the travel speed is equal or greater than a predetermined value (for example, if the travel speed of the working machine 1 is greater than the maximum speed of the working machine 1), the monitoring device 101 transmits a notification signal to the portable terminal 102 and/or the controller 60. The predetermined value in such a case may be, for example, a value equal to or greater than the maximum travel speed achievable by the automatically traveling working machine 1. Note that the monitoring device 101 does not transmit a notification signal in other cases.

A monitoring system 200 for a working machine according to a second embodiment as discussed above includes: a position detector 62 to determine a position of a working machine 1 based on one or more signals (radio waves) from one or more positioning satellites; an area setter 100 to set at least one work area E1 to E4 in which work is to be done by the working machine 1; and a monitor (monitoring device) 101 to provide a notification if the position W1$i$ of the working machine 1 determined by the position detector 62 is outside the at least one work area E1 to E4 and the degree of fluctuation is less than a predetermined value, the degree of fluctuation being the degree to which the position W1$i$ of the working machine 1 (machine body position) determined by the position detector 62 fluctuates into and out of the at least one work area E1 to E4, and not provide the notification if the degree of fluctuation is equal to or greater than the predetermined value even when the position W1$i$ of the working machine 1 determined by the position detector 62 is outside the at least one work area E1 to E4.

There may be cases in which, for example, even if the working machine 1 is located within a work area E1 to E4, the machine body position W1$i$ fluctuates due to positioning errors or the like of the position detector 62 and is located outside the work area E1 to E4 when, for example, the working machine 1 is working in the vicinity of the periphery of the work area E1 to E4. Even in such cases, with the above configuration, the monitor 101 determines that the degree of fluctuation is equal to or greater than the predetermined value and possible to prevent or reduce unnecessary notifications. On the contrary, when the working machine 1 is about to be stolen from the work area E1 to E4, the monitor 101 determines that, even if the machine body position W1*i* determined by the position detector 62 is located outside the work area E1 to E4, such movement of the machine body position W1*i* is not caused by the fluctuation resulting from positioning errors or the like, and provides a notification indicating that the working machine 1 is about to be stolen. That is, it is possible to protect the working machine 1 from theft at, for example, a location where the working machine 1 does work.

In the second embodiment, the monitor 101 may be configured or programmed to determine a direction of travel of the working machine 1 based on a plurality of the positions W1*i* of the working machine 1 determined by the position detector 62, and provide the notification if the working machine 1 is not driven and the direction of travel of the working machine 1 does not change by a predetermined angle or more for a predetermined period of time or more.

With this, by determining the direction of travel of the working machine 1, the monitor 101 is capable of easily determining whether or not the working machine 1 is about to be stolen from the work area E1 to E4. Specifically, when the working machine 1 is not being driven, the machine body position W1*i* stays at or near the work area E1 to E4; therefore, in the case where the direction of travel of the working machine 1 is determined based on the machine body positions W1*i*, the state in which the direction of travel of the working machine 1 does not change by a predetermined angle or more will not continue for a predetermined period of time or more, because of fluctuations. It is therefore possible to prevent or reduce unnecessary notifications. On the contrary, when the working machine 1 is about to be stolen using a car carrier such as a truck, in the case where the direction of travel of the working machine 1 is determined based on the machine body positions W1*i*, the state in which the direction of travel of the working machine 1 does not change by a predetermined angle or more may continue for a predetermined period of time or more, because the machine body position W1*i* moves as the car carrier moves. Therefore, it is possible to provide a notification indicating that the working machine 1 is about to be stolen.

In the second embodiment, the monitor 101 may be configured or programmed to determine a direction of travel of the working machine 1 based on a plurality of the positions W1*i* of the working machine 1 determined by the position detector 62, and provide the notification if the direction of travel of the working machine 1 is away from the at least one work area E1 to E4 for a predetermined period of time or more. With this, it is possible to provide a notification indicating that the working machine 1 is about to be stolen using a car carrier to attract attention of the user or the like, and thus possible to protect the working machine 1 from theft at, for example, a location where the working machine 1 works.

In the second embodiment, the monitor 101 may be configured or programmed to determine a travel speed of the working machine 1 based on a plurality of the positions W1*i* of the working machine 1 determined by the position detector 62, and provide the notification if the travel speed is equal to or greater than a predetermined value. This also makes it possible to provide a notification indicating that the working machine 1 is about to be stolen using a car carrier to attract attention of the user or the like, and thus possible to protect the working machine 1 from theft at, for example, a location where the working machine 1 works.

In the second embodiment, the monitor 101 may be configured or programmed to provide the notification if the position of the working machine 1 determined by the position detector 62 is at a predetermined distance or more from the at least one work area E1 to E4. This makes it possible to provide a notification indicating that the working machine 1 is about to be stolen and taken away from the work area E1 to E4 to attract attention of the user or the like, and thus possible to protect the working machine 1 from theft at, for example, a location where the working machine 1 works.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monitoring system for a working machine, the monitoring system comprising:
    a working machine including a machine computer and a position detector to determine a position of the working machine based on radio waves from one or more positioning satellites;
    a mobile terminal including a terminal computer, a notifier having a display or a speaker, and a memory to store map information indicating whether or not there is a predetermined blocking object to block the radio waves in at least one work area, the at least one work area being at least one area in which work is to be done by the working machine; and
    a monitor including a monitoring computer, which is configured to communicate with the machine computer and the terminal computer, wherein
    the terminal computer is configured or programmed to:
        determine whether or not there is the blocking object in the at least one work area based on the map information read from the memory;
    set work area information indicating whether at least one work area is in a shielded environment or an unshielded environment;
        if determining that there is the blocking object in the at least one area, determine that the at least one area is in the shielded environment in which the radio waves are blocked; and
        if determining that there is no blocking object in the at least one work area, determine that the at least one work area is in the unshielded environment in which the radio waves are not blocked; and
    the monitoring computer is configured or programmed to:
        determine the at least one work area indicated by the work area information as being in the unshielded environment to have high sensitivity of position determination;
        determine the at least one work area indicated by the work area information as being in the shielded environment to have low sensitivity of position determination; and
        monitor and cause the notifier to provide a notification, if the sensitivity of position determination communicated from the position detector of the working machine is decreased from the high sensitivity of position determination beyond a predetermined sensitivity of the position determination or increased from the low sensitivity of the position determination beyond the predetermined sensitivity of position determination.

2. The monitoring system according to claim 1, wherein the terminal computer is configured or programmed to:
   acquire content of the work to be done by the working machine and map information about the position of the working machine determined by the position detector and a vicinity thereof; and
   set the work area information about the at least one work area based on the content of the work and the map information.

3. The monitoring system according to claim 1, wherein the monitoring computer is configured or programmed to cause the notifier to provide the notification if the working machine is driven and the sensitivity of the position determination by the position detector changes from a value equal to or greater than the predetermined value to a value less than the predetermined value.

4. The monitoring system according to claim 1, wherein the terminal computer is configured or programmed to:
   acquire map information indicating whether or not there is a blocking object to block the radio waves in the at least one work area, and content of the work to be done by the working machine; and
   if there is a blocking object in the at least one work area and the content of the work relates to construction in the shielded environment, set the work area information indicating that the at least one work area is in the shielded environment.

5. The monitoring system according to claim 1, wherein the terminal computer is configured or programmed to:
   acquire map information indicating whether or not there is a blocking object to block the radio waves in the at least one work area, and content of the work to be done by the working machine; and
   if there is no blocking object in the at least one work area and the content of the work relates to construction in the unshielded environment, set the work area information indicating that the at least one work area is in the unshielded environment.

6. The monitoring system according to claim 1, wherein the monitoring computer is configured or programmed to:
   associate the position of the working machine determined by the position detector with map information; and
   not cause the notifier to provide the notification if the position associated with the map information is at a location indicated by the map information and unreachable by the working machine.

7. A monitoring system for a working machine, the monitoring system comprising:
   a working machine including a machine computer and a position detector to periodically determine a plurality of positions of the working machine based on one or more signals from one or more positioning satellites;
   a mobile terminal including a terminal computer, a notifier having a display or a speaker, and a memory to store map information indicating at least one work area, in which work is to be done by the working machine; and
   a monitor including a monitoring computer, which is configured to communicate with the machine computer and the terminal computer; wherein
   the monitoring computer is configured or programmed to:
      calculate a plurality of travel vectors of the working machine, each including a travel direction and a travel distance, based on the plurality of positions periodically determined by the position detector;
      cause the notifier to provide the notification if a magnitude of a composite vector obtained by combining the plurality of travel vectors over a predetermined number of combined travel vectors is equal to or greater than a predetermined value, and a travel position indicated by the composite vector is out of the at least one work area; and
      not cause the notifier to provide the notification if the magnitude of the composite vector is less than predetermined value, regardless of whether or not the travel position is out of the at least one work area.

* * * * *